J. H. MARLOW.
OVEN OR KILN.
APPLICATION FILED JAN. 4, 1921.
1,434,717.
Patented Nov. 7, 1922.
5 SHEETS—SHEET 1.
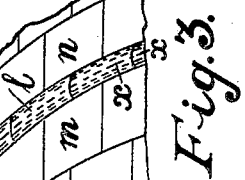
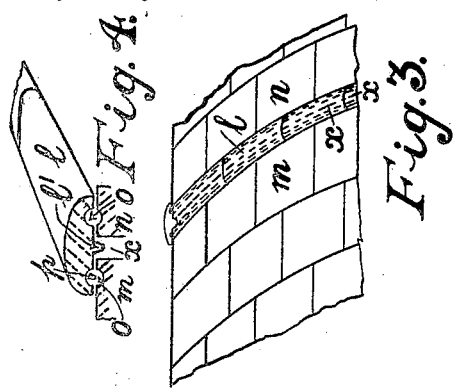
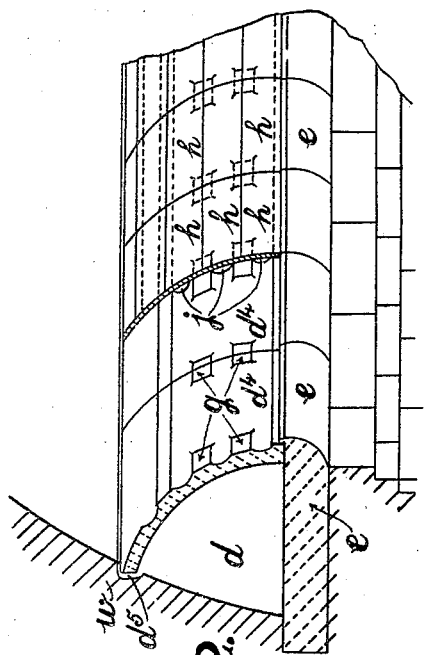
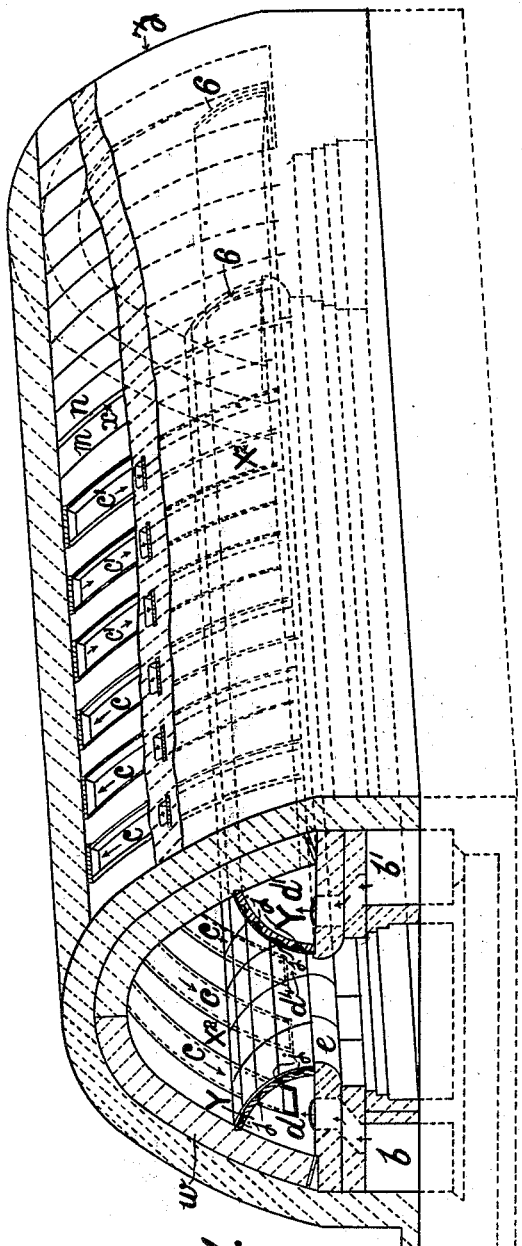
Inventor,
John H. Marlow,
by Herbert W. Jenner,
Attorney.

J. H. MARLOW.
OVEN OR KILN.
APPLICATION FILED JAN. 4, 1921.

1,434,717.

Patented Nov. 7, 1922.
5 SHEETS—SHEET 2.

Inventor,
John H. Marlow
by Herbert W. Jenner
Attorney

J. H. MARLOW.
OVEN OR KILN.
APPLICATION FILED JAN. 4, 1921.

1,434,717.

Patented Nov. 7, 1922.
5 SHEETS—SHEET 4.

Inventor,
John H. Marlow
by Herbert W. T. Jenner
Attorney.

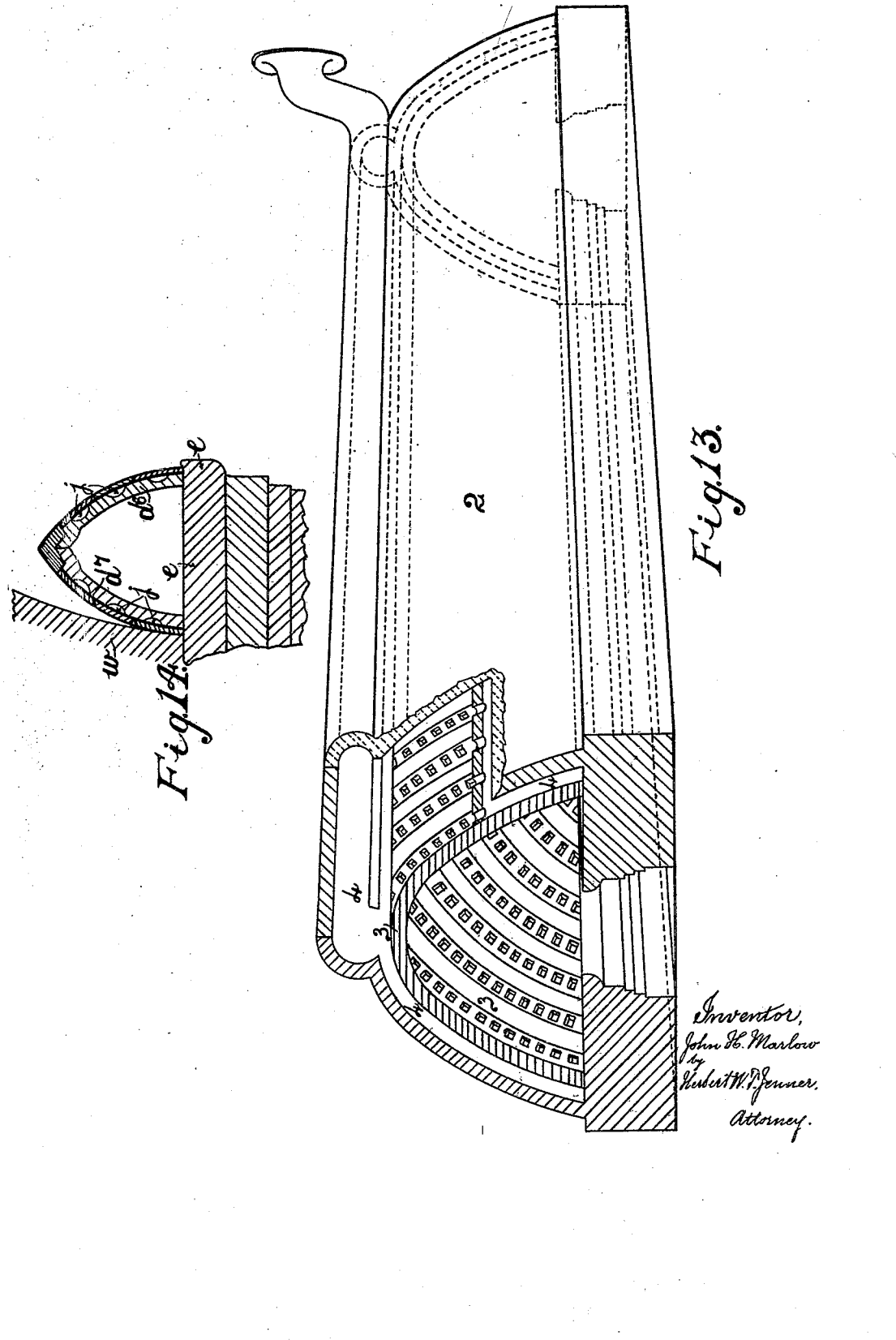

Patented Nov. 7, 1922.

1,434,717

UNITED STATES PATENT OFFICE.

JOHN HENRY MARLOW, OF STOKE-UPON-TRENT, ENGLAND.

OVEN OR KILN.

Application filed January 4, 1921. Serial No. 434,979.

*To all whom it may concern:*

Be it known that I, JOHN HENRY MARLOW, subject of the King of Great Britain and Ireland, and resident of Stoke-upon-Trent, in the county of Stafford, England, manager, have invented certain new and useful Improvements in Ovens or Kilns (for which I have applied for a patent in Great Britain on December 4, 1916, Patent No. 113,794), of which the following is a specification.

My invention relates to ovens or kilns for heating or firing ware when in the biscuit state such as tiles, pottery, fireclay goods or the like, or for glazing or enamelling ware such as pottery, tiles and the like, the object being to provide an oven or kiln having a combination of improved arrangements whereby the heat from the combustion of gas can be more economically and effectively utilized, and controlled than has been possible in ovens or kilns hitherto constructed.

Prior to the date of this invention ovens for the purposes specified have been constructed in the form of a tunnel having combustion chambers of refractory material arranged longitudinally at each side of the oven, the combustion chamber also serving as a heat chamber for the transmission of heat. The said longitudinal combustion chambers have been arranged clear of the walls of the tunnel, and a carrier or vehicle for the goods to be treated, has been arranged between the two longitudinal combustion chambers. The said combustion chambers being of refractory material soon deteriorate or become fractured through the combustion which takes place therein and consequently much time is lost and expense incurred.

My improved oven or kiln is constructed with separate combustion chambers communicating with a gas generator, the combustion taking place prior to the heat entering specially constructed heat distributing conduits arranged longitudinally on each side of the interior of the oven or kiln.

Figure 5:
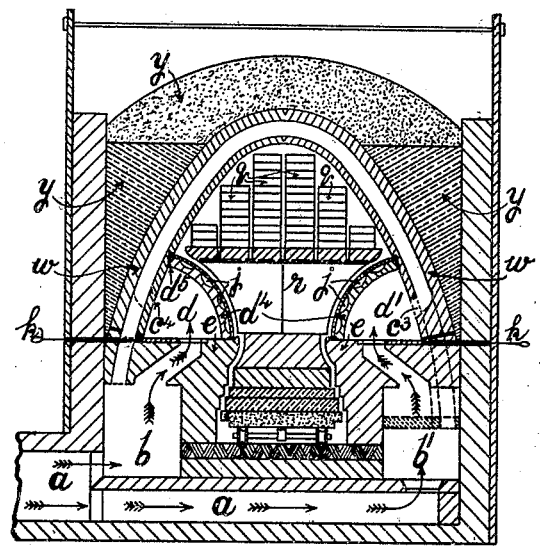
Figures 6, 7:
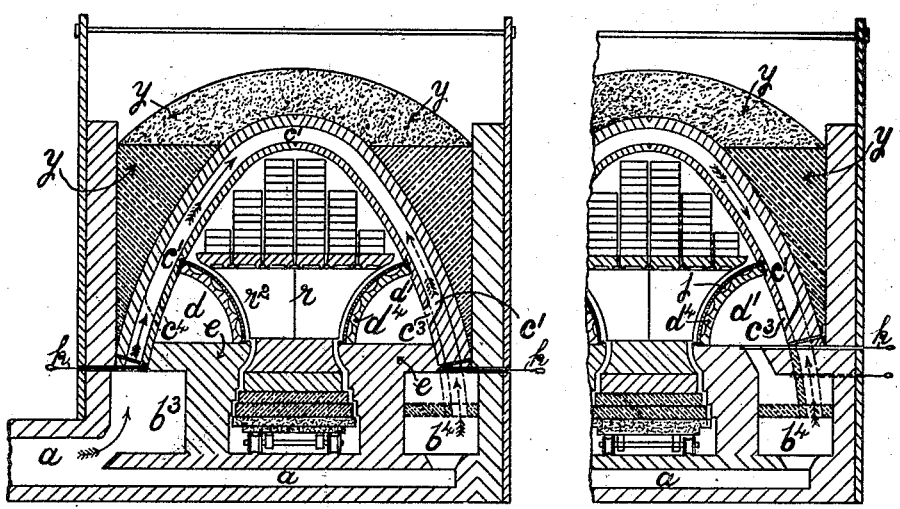
Figure 8:
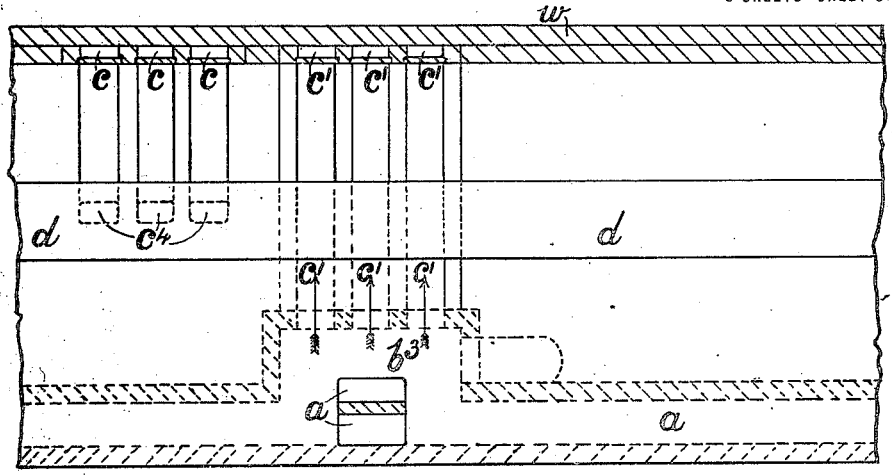
Figures 9, 10:
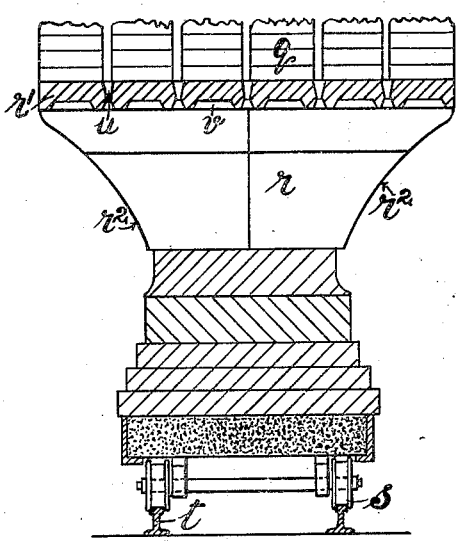
Figure 11:
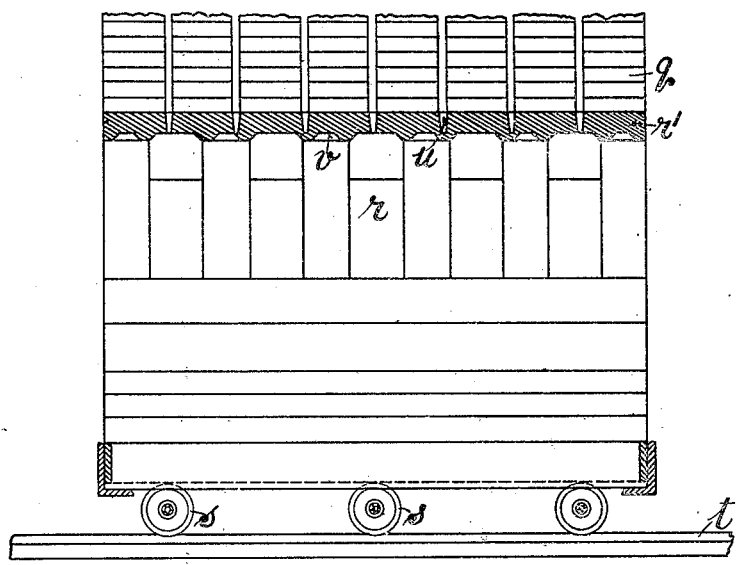
Figure 12:
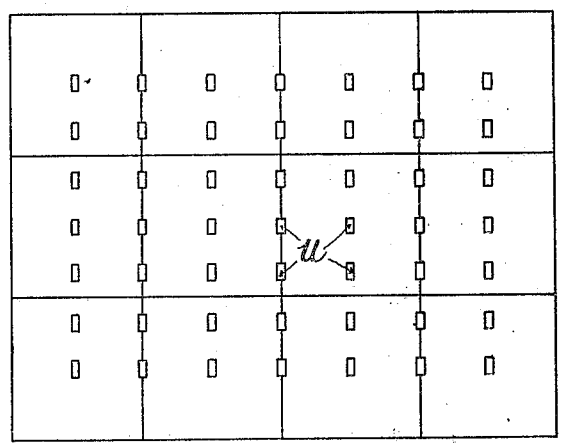

My invention will be fully described with reference to the accompanying drawings in which, Fig. 1 is a diagrammatic view of the fire zone of a tunnel oven constructed in accordance with my invention, Fig. 2 is a similar view of a specially constructed heat conduit, which is arranged longitudinally at each side of the oven, Fig. 3 is a detail of part of the tunnel or oven showing an expansion joint to be hereinafter described, Fig. 4 is a sectional end elevation, to a larger scale, of the expansion joint shown at Fig. 3, Fig. 5 is a transverse section of the oven or kiln, Fig. 6 is a similar view to Fig. 5 showing the flues, in the wall or archway of the tunnel, for circulating the heat, Fig. 7 is a view showing only the right hand portion of Fig. 6 to further illustrate the way the heat is circulated through the flues, Fig. 8 is a longitudinal section of Fig. 5 also illustrating the flues, Fig. 9 is a diagram showing the means employed for introducing the air to be mixed with the gas to be hereinafter described, Fig. 10 is a sectional elevation of the vehicle or carrier for the articles to be treated, Fig. 11 is a side elevation of the vehicle or carrier shown at Fig. 10, Fig. 12 is a plan of the top portion of the vehicle or carrier, Fig. 13 is a diagrammatic view of a perforated cooling chamber, to be hereinafter described, forming part of my invention, and Fig. 14 is a cross section showing a modification of a heat conduit to be hereinafter referred to.

According to my invention I construct the oven or kiln with two combustion chambers $b$ $b^1$ (see Fig. 5) into which the gas issuing from a generator and through passage $a$ is mixed with hot air, when combustion takes place, the flame caused thereby passing into conduits $d$ $d^1$ extending longitudinally on each side of the oven or kiln; the heat created then radiates round the oven and in and about the ware or the like to be fired, glazed, or otherwise treated. The goods to be treated are carried on a specially constructed carrier which will be described later. To ensure the successful firing or glazing of all bodies two further combustion chambers $b^3$ and $b^4$ are built, one at each side of the oven, below the conduits $d$ $d^1$ as shown at Fig. 6. The gas being introduced and mixed with hot air as before mentioned, the flame produced is carried from either side of the tunnel through a series of flues $c$ and $c^1$, six flues being shown on the drawings. Three of the flues work in one direction, whilst the other three work in an opposite direction. The flame passes through the three flues $c^1$ in the direction of the arrows shown in full lines at Figs. 6 and 8 the heat entering the conduit $d^1$ through openings $c^3$. The other three flues $c$ carry the flame in the opposite direction that is, in the direction of the dotted arrows (Fig. 6) the heat entering the conduit $d$ through openings $c^4$. By this means each series of flues circulate or convey the heat in opposite directions to the two heat conduits $d$ and $d^1$, the waste heat being carried away by suction from a fan or chimney.

Air is introduced to the gas in the combustion chamber by means of a pipe 20 as shown in the diagram, Fig. 9, the combustion taking place at or near the outlet end of the pipe the flame then entering the conduit as will be understood.

The combustion chambers $b$ and $b^1$ or $b^3$ and $b^4$ (see Figs. 5, 6 and 7) are structurally a part of the oven termed the fire zone, this portion of the oven being so constructed that expansion and contraction cannot possibly cause fractures; therefore no gases can enter the oven containing the ware or goods to affect the quality thereof.

The combustion chambers $b^3$ and $b^4$ are normally independent of the conduits $d$ $d^1$ and are held in reserve so that a second supply of flame can be utilized to feed the rings $c$ and $c^1$ when a more excessive heat is required which is supplied by an independent conduit $a$ (shown at Fig. 6) there being two passages leading from the gas producer.

The conduits $d$ $d^1$ through which the flame is drawn are built up in sections, that is, of curved slabs $d^4$ or plates placed side by side of each other as shown at Fig. 2. Each of the said curved slabs $d^4$ rests on the base block $e$ of the tunnel and in a recess $d^5$ in the wall of the oven (see Figs. 2 and 5) so that the inner face of the curved portion, the blocks $e$ and the inner face of the tunnel form the conduits $d$ $d^1$, for the purpose specified. As shown in the drawings sufficient space is left in the recess $d^5$ to allow for expansion and contraction. Some of the curved slabs or sections $d^4$ at each side of the fire zone have a series of studs or projections $g$ on which a layer of slabs $h$ of refractory material is laid so as to form cavities or chambers $j$ into which air is drawn and superheated in a manner to be described, thereby considerably increasing the temperature of the fire zone which may be controlled by dampers $k$, the intensity of the heat being greater than in ovens or kilns hitherto constructed.

The air in the tunnel travels from the cooling zone towards the heating zone $X^2$ and outlet of tunnel at $z$ (Fig. 1) and consequently the air is heated by the hot carriers $r$ after they leave the heating zone $X^2$. The heated air, travelling as stated, passes through the cavities or chambers $j$ at the end $Y$ on either side of the fire zone $X^2$ by which means it is superheated by the heat in the conduits before passing out at the end of the chambers $j$ at 6 where it penetrates the carrier entering the fire zone $X^2$ at a higher temperature than would be the case with a plain or uncovered surface.

The oven or kiln is built in sections $m$ $n$ as shown at Figs. 1, 3 and 4 over each division $x$ of which specially constructed covering bricks $l$ are laid to make an air tight joint. The sections $m$ and $n$ and the covering bricks are grooved at $o$ and $p$, respectively, to form a cavity for sand or the like suitable material and to make tight joints whilst a projection $l^1$ on the underside of the brick engages the division $x$ between the two sections $m$ and $n$. The walls $w$ of the oven or kiln are constructed so as to allow for expansion and contraction and the portion of the oven known as the fire zone (see Figs. 5, 6 and 7) has a covering of nonconducting material at $y$.

The carrier or vehicle for carrying the tiles or other goods to be treated is shown in sectional elevation at Fig. 10 and in side elevation, partly in section, at Fig. 11. In these figures the tiles are represented at $q$ on the carrier $r$, $s$ being the wheels thereof and $t$ the rails or track. The top $r^1$ of the carrier is in the form of a plate or slab having perforations at $u$ (see plan Fig. 12) and formed with cavities $v$ on its underside to allow the hot air to circulate. The sides $r^2$ of the carrier (see Figs. 5, 6, 7 and 10) are preferably of the same curvature as the convex face of the heat conduits $d$ and $d^1$ so that the carrier when passing through the fire zone, is in close proximity thereto.

At a suitable distance from the fire zone portion of the oven or kiln, is arranged a cooling chamber 2 constructed as shown at Fig. 13. The inner perforated archway 3 is arranged a little distance away from the outer walls of the tunnel, so as to form a passage 4 through which heat may escape or be drawn therethrough.

The vehicle or carrier $r$ loaded with tiles or other goods from the firing zone, is drawn through the cooling chamber 2 thereby ensuring a quicker and much better method of cooling than hitherto, this cooling chamber being particularly arranged and controlled to obviate "dunting".

Instead of constructing the conduits $d$ and $d^1$ of curved slabs or the like sections $d^4$ taking against or in the wall of the oven as hereinbefore described we may, in some cases, construct each of the conduits of two side pieces, slabs, or plates $d^6$ and $d^7$ (see Fig. 14) both resting on the base block $e$ of the tunnel, the inner curved piece $d^7$ taking against the wall of the tunnel as shown. In this case also both curved pieces are formed with the cavities or chambers $j$ for the purpose stated.

What I claim as my invention and desire to secure by Letters Patent is:—

1. An oven or kiln for the purposes stated having combustion chambers arranged below the top of the base block of the tunnel, said combustion chambers communicating heat to conduits arranged longitudinally inside the oven or kiln and also through passages or flues formed in or round the archway in conjunction with the conduits of the oven substantially as described.

2. In an oven or kiln for the purposes stated the combination with combustion chambers arranged below the top of the base block of the tunnel as claimed in claim 1, said heat conduit arranged longitudinally at each side of the tunnel and constructed of curved slabs or sections having chambers or cavities formed on the convex face thereof through which air is drawn and superheated to increase the intensity of the heat, each slab or section being placed side by side of each other with their lower edges resting on the base block of the tunnel and with their upper ends taking in a recess in the wall of the tunnel, the latter and the curved slabs and the base block forming a heat conduit capable of expansion and contraction substantially as described.

3. An oven or kiln of the type herein referred to having its outer walls or tunnel built in sections to allow for expansion and contraction, the division between each section being covered by bricks or slabs having cavities or recesses for sand or the like material to form an air-tight joint substantially as described.

In testimony whereof I have hereunto set my hand in the presence of two witnesses.

JOHN HENRY MARLOW.

Witnesses:
J. BENTON,
J. H. COPESTAKE.